United States Patent
Smith et al.

(10) Patent No.: US 9,474,365 B2
(45) Date of Patent: Oct. 25, 2016

(54) TANDEM SPRING SYSTEM

(71) Applicant: General Electric Company, Schenectady, NY (US)

(72) Inventors: Brandon Allan Smith, Waukesha, WI (US); Chad Allan Smith, Franklin, WI (US); Mark Tercha, Mukwonago, WI (US); Jaime Lehrer, Greenfield, WI (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 5 days.

(21) Appl. No.: 14/664,157

(22) Filed: Mar. 20, 2015

(65) Prior Publication Data

US 2016/0270523 A1 Sep. 22, 2016

(51) Int. Cl.
*A47B 9/00* (2006.01)
*A47B 9/02* (2006.01)
*F16F 13/00* (2006.01)

(52) U.S. Cl.
CPC .............. *A47B 9/02* (2013.01); *F16F 13/002* (2013.01)

(58) Field of Classification Search
CPC ............ A47B 9/20; A47B 9/00; A47B 9/04; A47B 9/02; A47B 9/10; A47B 9/16; A47B 13/02; A47B 13/003; A47B 2009/003; A47B 20/006; F16M 11/32
USPC ....... 108/147, 144.11, 147.19, 145, 136, 20; 248/188.4, 618, 631, 630; 254/22, 124, 254/126, 93 R, 93 L; 5/11, 611; 378/209; 324/321
See application file for complete search history.

(56) References Cited

U.S. PATENT DOCUMENTS

| | | | | |
|---|---|---|---|---|
| 3,110,476 A | * | 11/1963 | Farris | B65G 69/24 108/119 |
| 3,376,795 A | * | 4/1968 | Allen | F15B 15/1466 14/36 |
| 3,891,108 A | * | 6/1975 | Traficant | B60P 1/02 254/122 |
| 4,071,222 A | * | 1/1978 | Wright | B66F 7/0625 254/124 |
| 4,221,280 A | * | 9/1980 | Richards | B66F 7/065 187/269 |
| 4,567,894 A | * | 2/1986 | Bergman | A61B 5/0555 403/325 |
| 4,577,821 A | * | 3/1986 | Edmo | B66F 7/08 108/145 |
| 4,671,728 A | * | 6/1987 | Clark | A61B 5/0555 414/284 |

(Continued)

FOREIGN PATENT DOCUMENTS

| FR | 1358447 | * | 4/1964 |
| GB | 952534 | * | 3/1964 |

(Continued)

OTHER PUBLICATIONS

International Search Report and written opinion issued in connection with corresponding WO Patent Application No. PCT/US2015/041639 on Dec. 22, 2015.

*Primary Examiner* — Janet M Wilkens
(74) *Attorney, Agent, or Firm* — Lucas Divine

(57) ABSTRACT

A dual-rate tandem spring system is described. The system may include a higher force spring and a lower force spring. The spring system may comprise gas springs. The spring system may be included in a table system to provide lift or descent assist of objects such as a patient. A damper may be installed in the spring system to provide smooth transition between lower and higher force springs.

19 Claims, 9 Drawing Sheets

(56) References Cited

U.S. PATENT DOCUMENTS

| | | | |
|---|---|---|---|
| 4,712,653 A * | 12/1987 | Franklin | B66F 7/08 108/145 |
| 4,898,103 A * | 2/1990 | Pontoppidan | A47B 9/02 108/136 |
| 4,899,987 A * | 2/1990 | Craig | B66F 7/08 254/122 |
| 5,005,492 A * | 4/1991 | Ogino | A47B 21/02 108/145 |
| 5,148,848 A | 9/1992 | Murray et al. | |
| 5,657,498 A * | 8/1997 | Hum | A47B 9/16 108/147 |
| 5,732,425 A * | 3/1998 | Leung | A61G 13/06 108/145 |
| 6,672,430 B2 * | 1/2004 | Boucher | B66F 7/08 108/145 |
| 6,691,626 B2 * | 2/2004 | Warner | A47B 9/00 108/145 |
| 7,171,911 B1 | 2/2007 | Rivera, Jr. et al. | |
| 7,407,239 B2 | 8/2008 | Kunz | |
| 7,412,931 B2 | 8/2008 | Seidl et al. | |
| 8,205,937 B2 | 6/2012 | Rivera, Jr. et al. | |
| 8,544,824 B2 | 10/2013 | Selkowitz | |
| 8,888,070 B2 * | 11/2014 | Olesen | A61G 5/1059 187/211 |
| 2002/0144349 A1 * | 10/2002 | Blyshak | A61G 13/02 5/614 |
| 2007/0089648 A1 * | 4/2007 | Harrison | A47B 9/16 108/115 |
| 2014/0027693 A1 * | 1/2014 | Hallman | B66F 5/00 254/8 C |
| 2014/0184225 A1 | 7/2014 | Xue et al. | |
| 2014/0291085 A1 | 10/2014 | Bandy | |

FOREIGN PATENT DOCUMENTS

| | | | |
|---|---|---|---|
| KR | 101471624 | * | 12/2014 |
| WO | 0037822 A1 | | 6/2000 |

* cited by examiner

TANDEM SPRING SYSTEM

BACKGROUND

The subject matter disclosed herein relates generally to spring systems and, more particularly, spring systems with multiple springs.

Many systems, such as medical imaging systems, automotive systems, garage door systems, and construction systems, may use spring systems for lift or descent assist. A spring system can reduce the load on a motor-driven elevation system. These spring systems can include a single mechanical coil spring in some instances.

Certain applications may require a spring system to provide less force or more force at different stages of a lift or descent procedure. There remains a need for a spring system that provides varying force and lift assist throughout a lift or descent procedure.

A specific example is a patient table in a medical imaging system. Based on the needed location for a patient to be situated during an imaging procedure, the system may need to raise or lower a patient on a patient table. Patients and patient tables can be of varying weights, putting pressure on a motion control device. Spring systems are needed to help motion control devices provide reliable, safe, and smooth elevation transitions in patient tables.

BRIEF DESCRIPTION

In accordance with an embodiment, a spring system is provided that can comprise a higher force spring comprising a first spring body and a first rod extending from the first spring body; a lower force spring comprising a second spring body and a second rod extending from the second spring body; a damper assembly attached to the first rod or the second rod; wherein the first spring body is positioned adjacent to the second spring body; and wherein the higher force spring, the lower force spring, and the damper assembly provide force in the same direction. In an embodiment, the higher force spring is a gas spring; and the lower force spring is a gas spring.

Further, the damper assembly can comprise a damper spring, the damper spring having a force between the force of the lower force spring and the higher force spring to provide smoothing of the force transition between the lower force spring and higher force spring during compression or extension of the spring system. In an embodiment, the damper is attached at the end of the second rod; and the lower force spring is positioned between the damper and the higher force spring. In an embodiment, the damper assembly comprises a damper spring; and the damper spring compresses after a lower force spring has substantially compressed and before the higher force spring substantially compresses. In an embodiment, the damper assembly comprises a damper spring and a mechanical stop to prevent full compression of the damper spring.

Further, the higher force spring and lower force spring are positioned back-to-back such that the first spring body is attached to the second spring body at the body end of each spring. In addition, the higher force spring does not compress until the lower force spring and the damper assembly are substantially compressed. In an embodiment, the higher force spring and the lower force spring are substantially cylindrical.

In accordance with an embodiment a table system is provided that can comprise a base; a table top; at least one table leg; a spring system comprising a higher force spring and a lower force spring, wherein the spring system is movably attached to the base and one of the table top or a table leg; a motion control device comprising a motor to move the table top in relation to the base; and wherein the spring system provides dual-rate assistance to the motion control device for a table movement operation. The table movement operation can be a raising or lowering motion of the table top with respect to the base. Further, the dual-rate assistance provides a lower lift force at higher elevations of the table top and a higher lift force at lower elevations of the table top. In an embodiment, the higher force spring is a gas spring; and the lower force spring is a gas spring.

In an embodiment, the higher force spring comprises a first spring body and a first rod extending from the first spring body; the lower force spring comprises a second spring body and a second rod extending from the second spring body; wherein the higher force spring and lower force spring are positioned back-to-back such that the first spring body is attached to the second spring body at the body end of each spring. The spring system can further comprise a damper assembly including a damper spring with a force between the force of the lower force spring and the force of the higher force spring; and the damper assembly is attached to the end of the second spring body. The higher force spring end of the spring system is attached to the base; and the damper assembly end of the spring system is attached to the one of the table top or a table leg.

Further, the spring system further can comprise a damper assembly. The damper assembly may comprise a damper spring with a force between the lower force spring and the higher force spring. The damper spring may be one of a mechanical spring, a coil spring, a rubber spring, spring washers, and a gas spring. In an embodiment, the damper assembly comprises a damper spring and a mechanical stop to prevent full compression of the damper spring.

DETAILED DESCRIPTION

Figure 1:
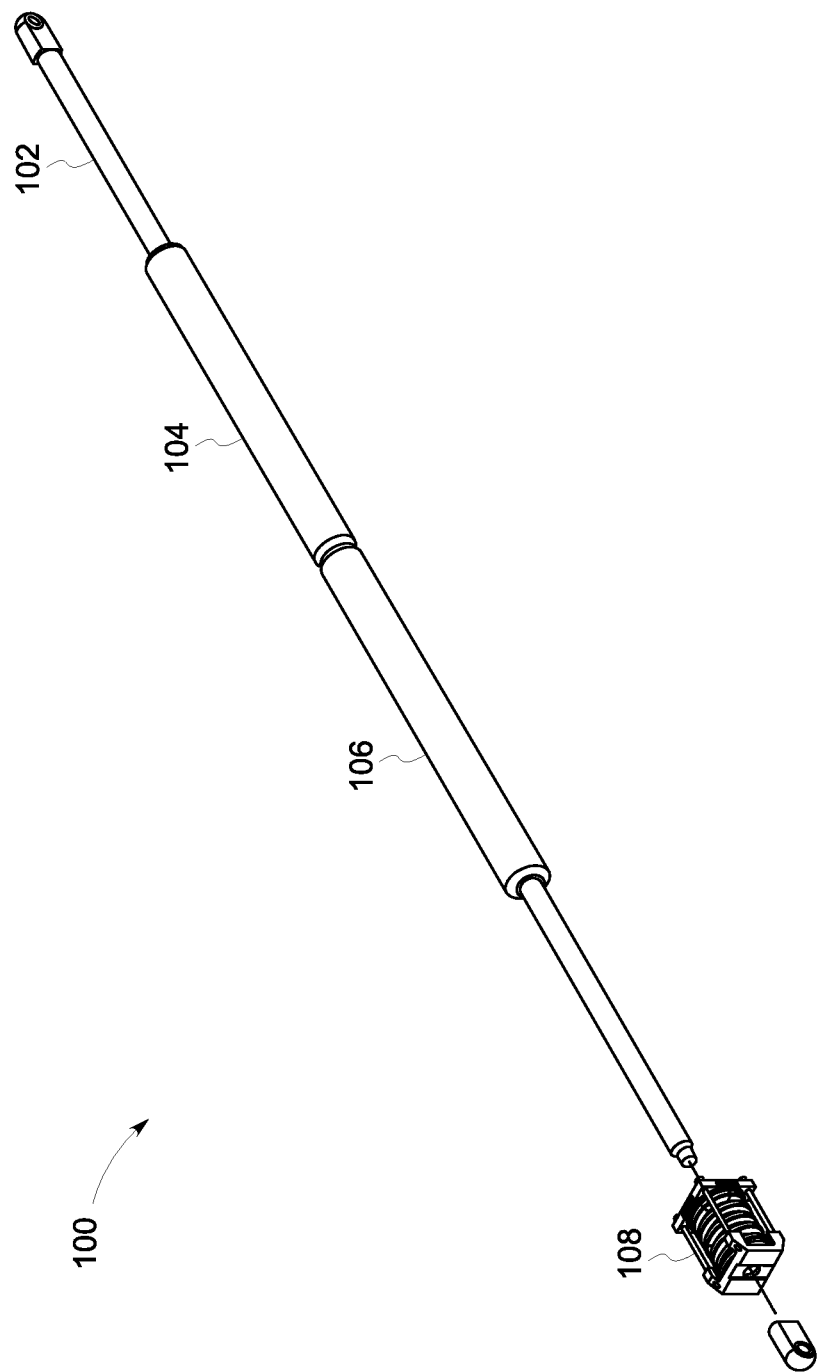
FIG. 1 is an angled view of a spring system in accordance with an embodiment.

The foregoing brief description, as well as the following detailed description of certain embodiments and claims, will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors, controllers or memories) may be implemented in a single piece of hardware (e.g., a general purpose signal processor or random access memory, hard disk, or the like) or multiple pieces of hardware. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

FIG. 1 is an angled view of a spring system in accordance with an embodiment. Spring system 100 may also be referred to as spring assembly or spring apparatus. Spring system 100 comprises a higher force gas spring 104 and lower force gas spring 106. Thus, spring system is a dual-rate, or dual-stage, tandem spring system. FIG. 1 shows higher force gas spring 104 and lower force gas spring 106 as cylindrical in a preferred embodiment.

Each gas spring shown in the embodiment of FIG. 1 comprises a rod and a spring body. The rod may have a flat end, threaded connection end, ball end, or pivot hole end, as examples. FIG. 1 shows threaded ends to which pivot hole devices and damper systems may be attached. The body is shown as the portion with larger diameter. The body, according to an embodiment, may include a tube, compressed gas, and a piston. The piston may be attached to the rod extending in one direction out of the body. In operation, as force is applied to the rod, the rod is pushed into the body, and the compressed gas provides opposing force. Each gas spring shown in FIG. 1 is a self-contained system and is sealed against loss. Other single gas spring designs are known in the art and may be suitably used. Higher force gas spring 104 and lower force gas spring 106 are not required to be gas springs, but are gas in a preferred embodiment. Gas springs can provide additional force with less size in certain applications.

Higher force gas spring 104 and lower force gas spring 106 are adjacent, or abutting, back-to-back to each other in a preferred embodiment. Thus, in the embodiment of FIG. 1, higher force gas spring 104 and lower force gas spring 106 provide a series load to spring system 100. Higher force gas spring 104 and lower force gas spring 106 are attached to one another in an embodiment. For example, they could be screwed together. This attachment is at the body-end of each gas spring in the embodiment of FIG. 1.

Spring system 100 is referred to as dual-rate because the springs in the system are of differing force loads. The specific force loads of each spring may be chosen for the particular application, an example of which is discussed in relation to FIG. 2. For the purposes of this specification, higher force gas spring 104 should be of a higher force load than lower force gas spring 106.

FIG. 1 also shows damper 108. Damper 108 may be included in spring system 100. In the embodiment of FIG. 1, damper 108 is placed at the end of the rod of lower force gas spring 106. Damper 108 may be placed at the end of the body of lower force gas spring 106, surrounding the lower force gas spring rod, in an alternate embodiment. Damper 108 may be alternatively referred to as damper system or damper assembly. Damper 108 provides a smooth transition between the lower and higher force gas springs. In a spring operation without damper 108, the transition from low to high force springs may cause large changes over a small amount of time in the force output of the spring system 100. This variation may be unacceptable in certain implementations of spring system 100, as discussed further with regard to FIG. 4 and FIG. 5.

Figure 2:
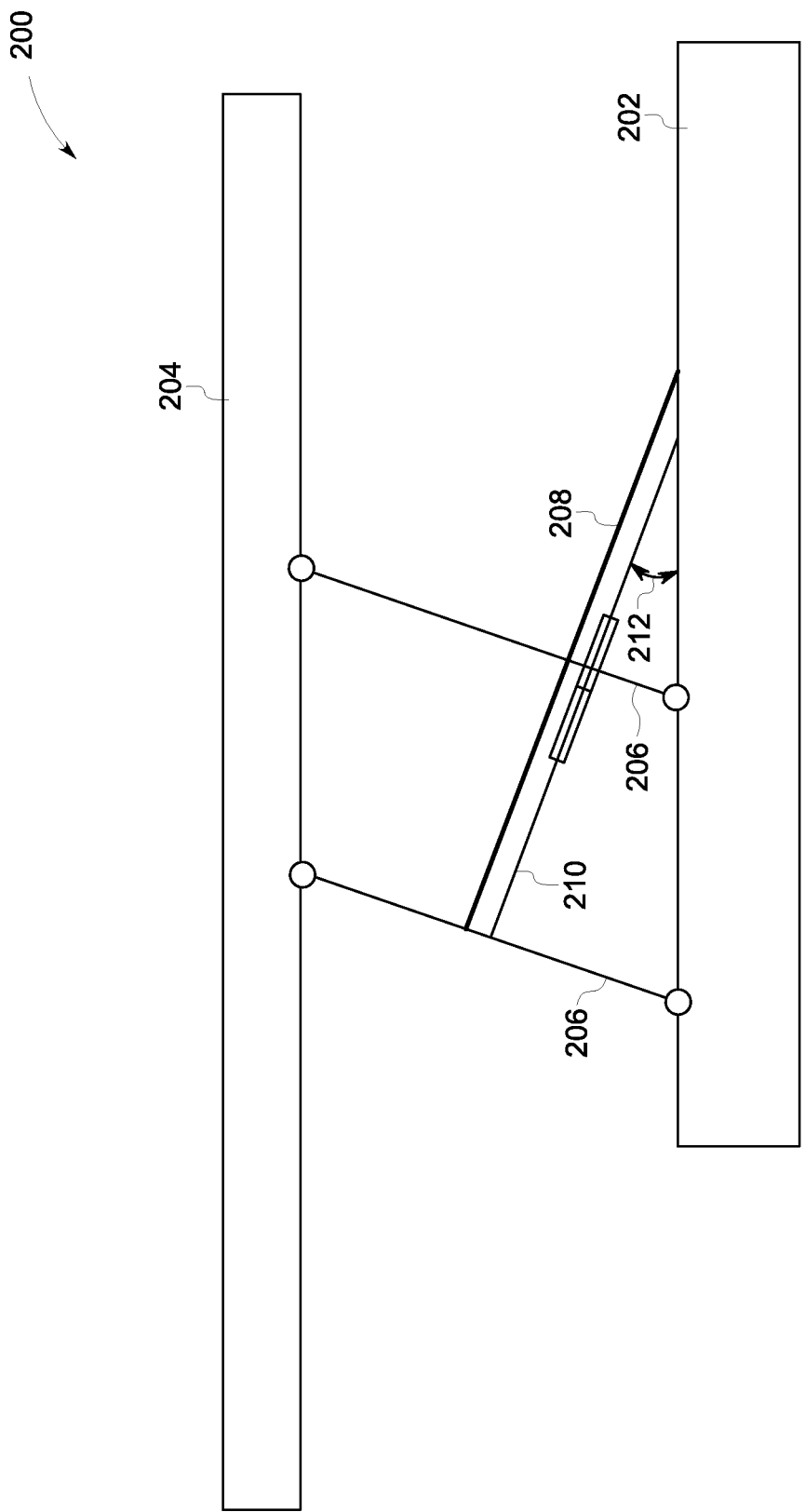
FIG. 2 is a side view of a first table system in accordance with an embodiment.

FIG. 2 is a side view of a first table system in accordance with an embodiment. The table system shown in FIG. 2 can be a medical imaging table system in an embodiment. FIG. 2 shows table system 200, base 202, table top 204, table leg 206, table motion control device 208, tandem spring 210, and angle 212.

For medical examinations that use imaging equipment such as magnetic resonance imaging (MRI) equipment, computed tomography (CT) equipment, positron emission tomography (PET) equipment, single photon emission computed tomography (SPECT) and other X-ray examination equipment, a patient or other object to be imaged may be positioned on table top 204. Table top 204 may include a portion that moves horizontally to position a patient in a certain Z-axis, or axial, location.

Table top 204 is connected to base 202 via one or more table legs 206 that are attached to both table top 204 and base 202 to provide structural support to table top 204. Base 202 may be positioned on a room floor, for example. Table legs 206 are movably attached in an embodiment.

One way to assist a patient in mounting onto a patient table is to provide the patient table with a capability to lift vertically. Further, a table may need to move vertically to place a patient in a best position in the medical imaging system for an imaging operation to be performed. See further at FIG. 9 and FIG. 10, below. The vertically lifting capability may be provided by a motion control device 208, alternatively called a vertical actuator or elevation drive system. Motion control device 208 may include a motor or hydraulic apparatus in varying embodiments. Motion control device 208 performs the work of mechanically raising and lowering table top 204.

Tandem spring 210 provides lift and descent assist to motion control device 208. Tandem spring 210 may be implemented as spring system 100. More than one tandem spring 210 may be utilized in the table system. Tandem spring 210 is shown as attached to base 202 and table leg 206 in the embodiment of FIG. 2. Tandem spring 210 is shown at a certain angle 212 in relation to the table base; tandem spring 210 can be positioned at an angle between 0 and 90 degrees. In a preferred embodiment, tandem spring 210 is pivotably attached to table base 202 so as to alter angle as table top 204 is raised and lowered.

Tandem spring 210 exerts dual-rate force that counteracts the weights of the patient and the table top. The lift force required to assist motion control device 208 at low table elevations is high due to low mechanical advantage of motion control device 208 and higher resistive forces of the table system. In contrast, the lift force needed to assist motion control device 208 at high elevations is lower due to high mechanical advantage of motion control device 208. This is one reason why dual-rate tandem spring 210 can provide superior lift assist to table system 200. Tandem spring 210 provides higher lift force at lower elevations of table top 204 and lower lift force at medium and higher elevations of table top 204. The particular stroke, or force load, selected for higher force gas spring lower force gas spring, and any related damper, as well as their load ratios, can be selected per the requirements of the particular system.

Due to the lift and descent assist provided by tandem spring 210, the motion control device 208 can be smaller, less powerful, and can endure less wear. Thus, cost may be saved and space requirements of motion control device 208 can be smaller, improving the medical table system 200. Further, in the case where motion control device 208 may lose power or become inoperable, the dual-rate nature of the tandem spring 210 provides drop prevention stability and support without providing excessive lift at high elevations.

In accordance with an embodiment, the table system can provide a fluid lifting motion for a patient, loading from zero load to the maximum recommended patient load. Tandem spring 210 can be designed to lift the full range of patient weights. The higher force spring can assist in lifting the heaviest patients at the worst mechanical advantage for motion control device 208. And the lower force spring can hold the table up at the highest position such that even with the minimum patient weight, the table top 204 will not rise up on its own from force from the lower force spring.

If a damper, such as damper 108, is installed in tandem spring 210 to provide smooth transition between higher force gas spring and lower force gas spring, the end of tandem spring 210 with the damper would be the upward end in an embodiment.

Figure 3:
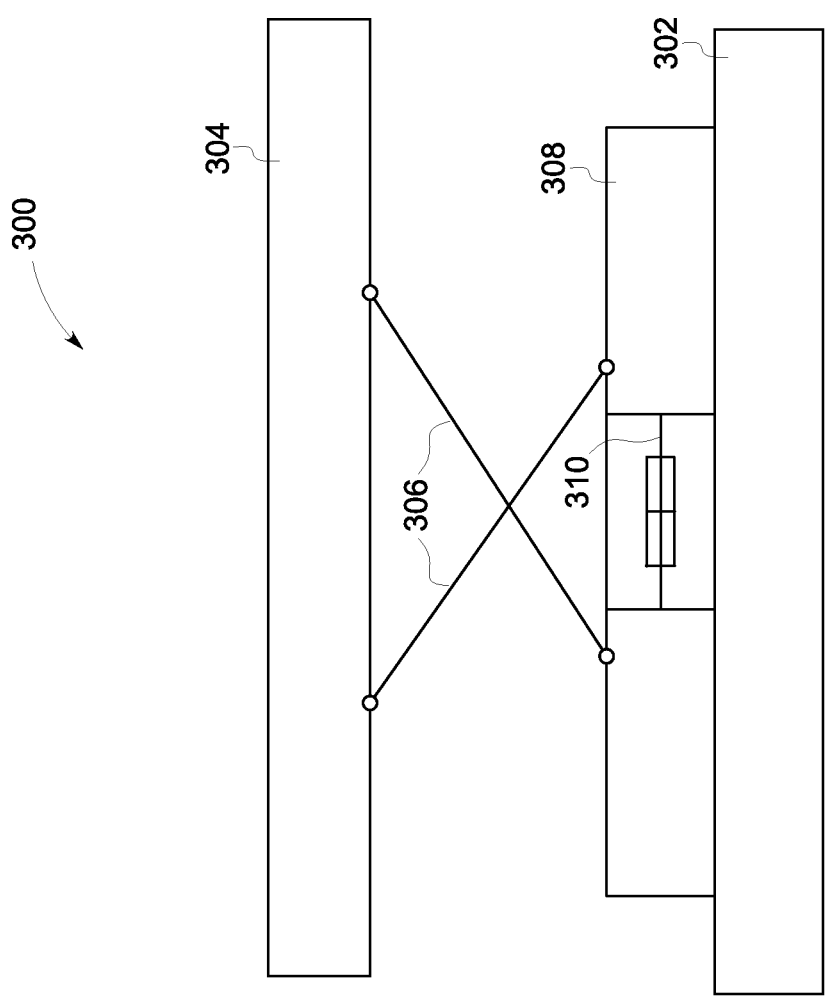
FIG. 3 is a side view of a second table system in accordance with an embodiment.

FIG. 3 is a side view of a second table system in accordance with an embodiment. FIG. 3 shows table system 300 with base 302, table top 304, table legs 306, frame 308, and tandem spring 310. A motion control device may also be installed in the system to raise and lower table top 304. Frame 308 may be a sliding cart. FIG. 3 shows a frame 308 on the right side of tandem spring 310, along with a second frame on the left side of tandem spring 310. These move to assist the raising and lowering of table top 304. Table legs 306 are the same length in an embodiment. Tandem spring 310 provides lift and descent assist to a motion control device. Tandem spring 310 exerts force against table legs 306. In this embodiment, the force exerted by the tandem spring is constant in direction.

Figure 5:
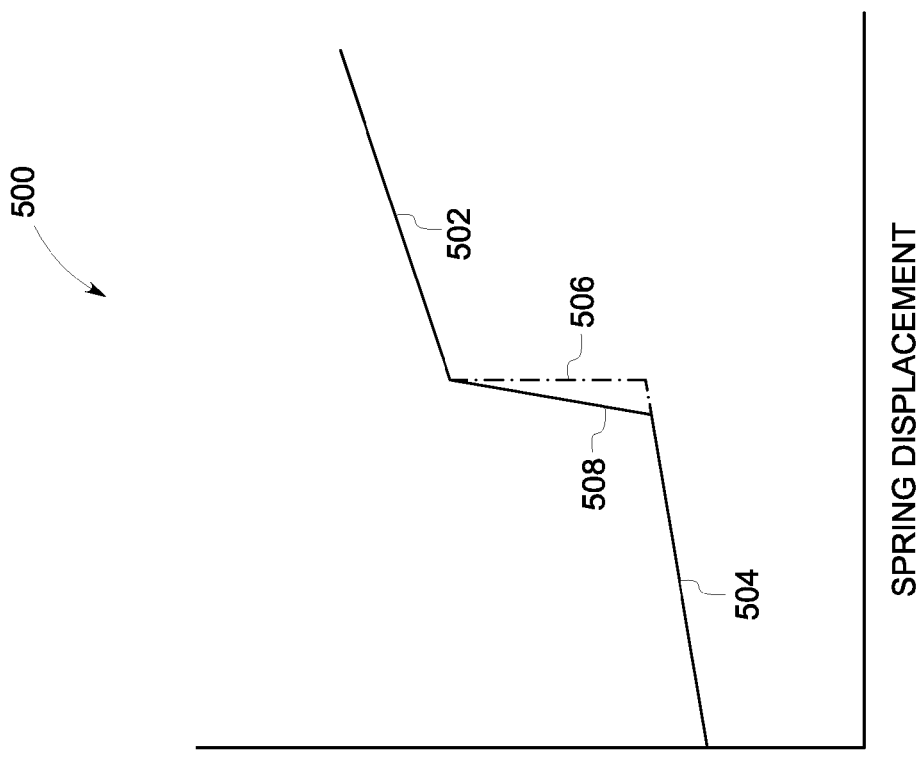
FIG. 5 is a graph of force outputs of a tandem spring system with a damper in accordance with an embodiment.
Figure 4:
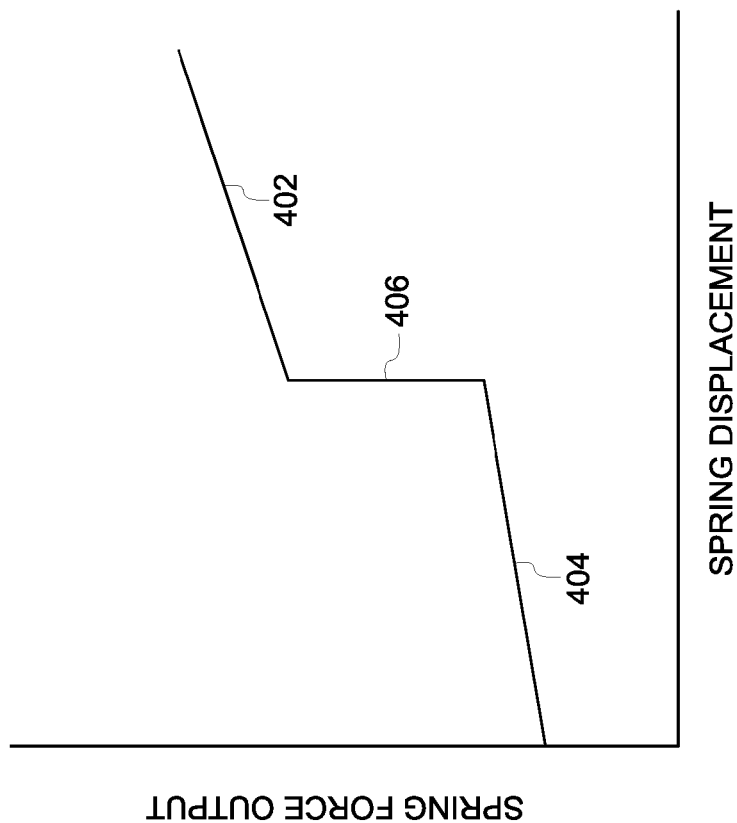
FIG. 4 is a graph of force outputs of a tandem spring system in accordance with an embodiment.
Figure 6:
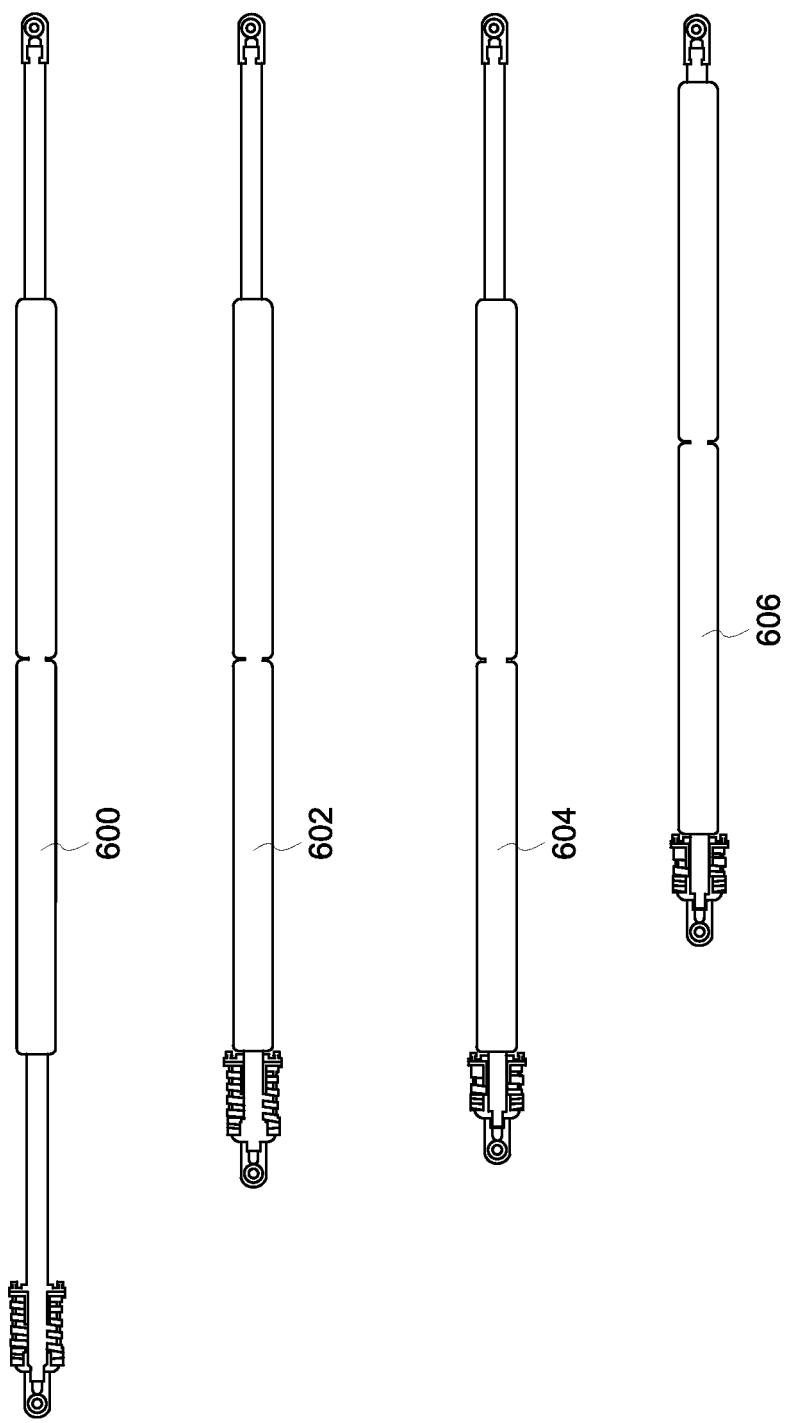
FIG. 6 is a step diagram of a spring system with increasing force applied in accordance with an embodiment.

FIG. 4 and FIG. 5 will be discussed in relation to FIG. 6. FIG. 4 shows a tandem spring assembly graph 400 for a tandem spring with no damper assembly, including higher force spring output 402, lower force spring output 404, and transition point 406. FIG. 5 shows a tandem spring assembly graph 500 for a tandem spring with a damper assembly, including higher force spring output 502, lower force spring output 504, transition point 506, and damper force output 508. FIG. 6 shows a tandem spring with a damper through four, as examples, compression positions, including non-compression position 600, lower force spring compression position 602, lower force spring and damper compression position 604, and full compression position 606. For the purposes of explanation of FIGS. 4-6, the system of operation will be discussed in terms as implemented in a table system, such as table system 200.

The left side of graph 400 and graph 500 represents a position where the tandem spring is not compressed, as shown in non-compressed position 600 of FIG. 6, discussed further below. This may be a state where table top 204 is fully elevated, in an example embodiment. The right side of graph 400 and graph 500 represents a position where the tandem spring is fully compressed, as shown in full compression position 606. Positions 602 and 604 show the operation of a tandem spring with a damper at each end of transition point 506, as the damper compresses to provide smoothing damper force output 508.

In a table system, such as table system 200, table top 204 may start in a lowered position, with the tandem spring in full compression position 606. Thus, the amount of force initially applied to help lift the table top is the highest, note the right side of each graph. As the table is raised by the motion control device 208 and assisted by the tandem spring 210, the amount of force in the lifting process decreases.

When the higher force spring is fully extended, the tandem spring 210 reaches a transition point 406 or transition point 506. This transition point 406, and transition point 506, is when one spring reaches the end of its travel and the other spring's travel starts. In a system with no damper, FIG. 4, the system would shift directly to lower force spring compression position 602 instead of having lower force spring and damper compression position 604. Thus, at transition point 406, a system without a damper might have a shudder as the transition between higher force spring and lower force spring occurs. In a system with a damper, FIG. 5, the system has a smoothed transition between higher force spring and lower force spring by damper force output 508, shown as the lower force spring and damper compression position 604 of FIG. 6. The higher the ratio of force output between the higher force spring and the lower force spring, the higher the risk of uncomfortable shudder due to the instantaneous force change. This shudder can impact the position or velocity performance of the motion control device and be felt by a patient on such a table and the motion control device. Thus, the damper provides an important smoothing function.

FIG. 5 is a graph of force outputs of a tandem spring system with a damper in accordance with an embodiment. FIG. 5 shows how a tandem spring including a damper can counteract instantaneous change in spring force when the spring travels through transition point 506. The damper provides a sloped line damper output 508 in place of a vertical line at transition point 506. The sloped line is a result of the damper spring force being exerted over a greater time and distance when compared to the instant force change by the higher force spring and lower force spring. The damper has a spring force output which is between the high and low force springs.

FIG. 6 is a step diagram of a spring system with increasing force applied in accordance with an embodiment. FIG. 6 shows that the lower force spring compresses first. Not until the lower force spring has reached the end of its compression, or stroke, does the higher force spring begin to operate. And, in the case of a damper installed, the transition is handled between lower force spring compression position 602 and lower force spring and damper compression position 604.

Figure 7:
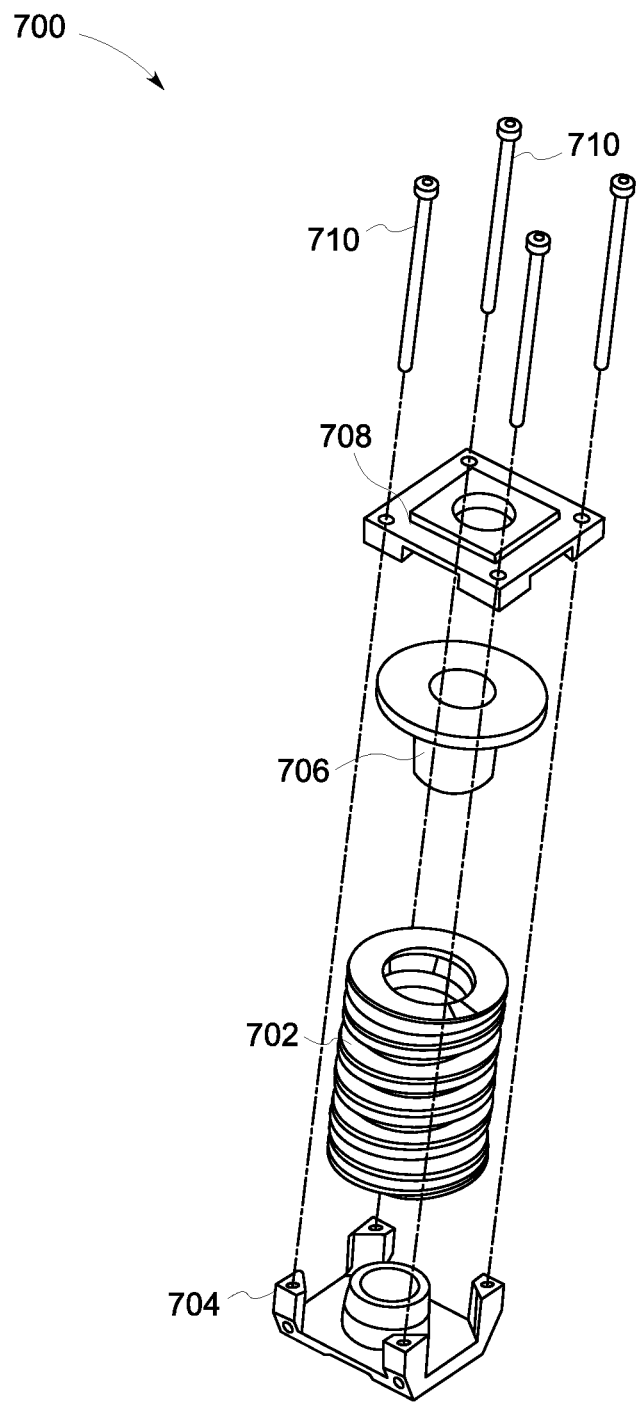
FIG. 7 is an angled view of a damper system in accordance with an embodiment.

FIG. 7 is an angled view of a damper system in accordance with an embodiment. Damper system is referred to as damper system 700 in FIG. 7 and damper system 800 in FIG. 8. The damper system comprises a damper spring 702, upper holder 704, spring guide 706, washer 708, and capture bolts 710.

Damper spring 702 may be a mechanical spring, a coil spring, a rubber spring, spring washers, a gas spring, or other suitable spring. Damper spring 702 compresses to provide a medium force output. Thus, damper spring eases the transition between a higher force spring and a lower force spring.

Upper holder 704 holds the assembly together by acting as an end connection point for capture bolts 710. Upper holder 704 has a mounting portion that attaches to the rod shaft 804, see FIG. 8. Upper holder 704 contains an end-stop to prevent damper spring 702 from compressing completely.

Figure 8:
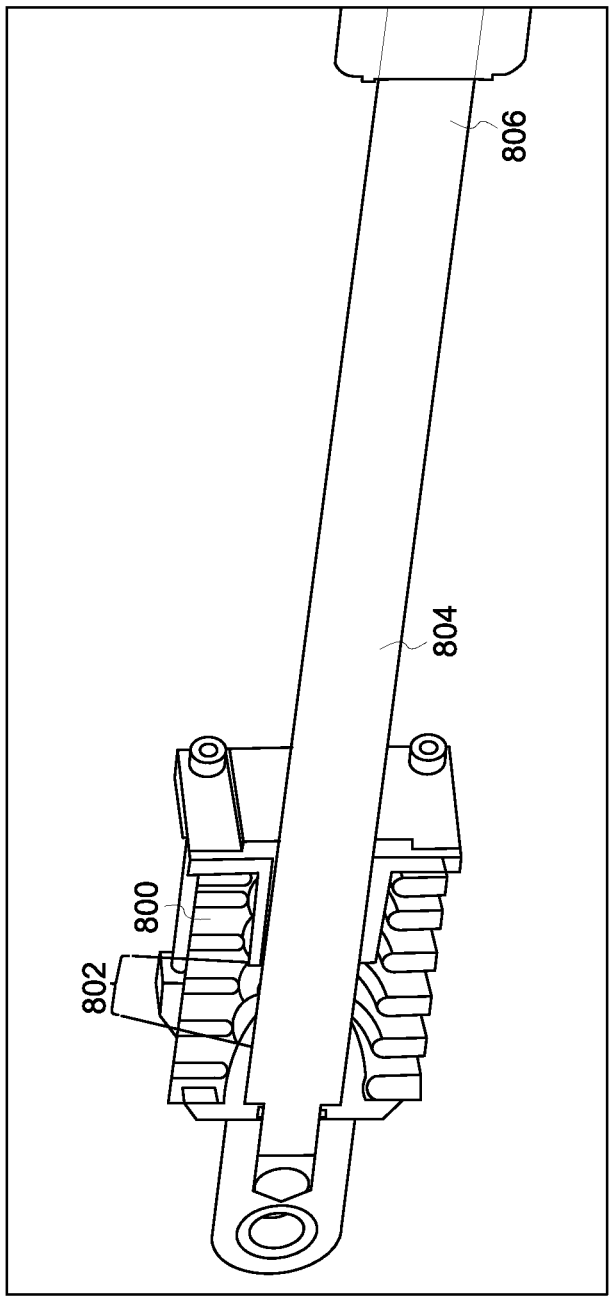
FIG. 8 is an angled and cross-section view of a damper system in a spring system in accordance with an embodiment.

Spring guide 706 acts to keep the spring straight. Spring guide 706 additionally contains an end-stop to prevent damper spring 702 from compressing completely. In conjunction with upper holder 704, a mechanical stop is thus formed to set a compression level of the damper spring. Mechanical gap 802 of FIG. 8 shows the maximum compression distance of damper spring 702 as created by upper holder 704 and spring guide 706. Mechanical gap 802 can be designed in conjunction with the spring rate of damper spring 702 to control spring compression to a maximum value for long spring fatigue life while allowing sufficient spring travel.

Washer 708 guides damper system 700 along the length of the gas spring rod shaft 804. Washer 708 is a non-marring washer to prevent surface wear on gas spring rod shaft 804. Washer 708 may be plastic in one embodiment to prevent abrading the surface of the gas spring rod shaft 804. Scratching or damaging the gas spring rod shaft 804 could lead to premature force loss of the lower force gas spring, which may additionally lead to increased motion control device wear and lower reliability as the motion control device must make up the difference from the lower force gas spring output.

Capture bolts 710 are shown as extending through washer 708 to upper holder 704 to hold the damper system 700 together. Capture bolts 710 help ensure the damper system is mounted at a consistent angle to rod shaft 804, helping to prevent any damage to rod shaft 804. The assembly of FIG. 7 is shown as having rectangular washer 708 and upper holder 704. In alternate embodiments, these may be cylindrical or the entire damper assembly may be placed in a cylindrical casing. This can remove catch points (e.g. corners) from the system in certain embodiments.

FIG. 8 is an angled and cross-section view of a damper system in a spring system in accordance with an embodiment. FIG. 8 shows a cross section of a damper system 800 and a pivot end attached to a lower force gas spring rod shaft 804. Mechanical gap 802 is shown as formed between a spring guide and upper holder. Mechanical gap 802 controls a maximum compression of damper system 800. Damper system 800 is mounted at the end of lower force gas spring rod shaft 804 in an embodiment. This exposes rod shaft 804 to the most minimum amount of wear. Alternate mounting point 806 is an alternate location for damper system to be attached to lower force gas spring, which can be implemented in an alternate embodiment.

The tandem spring system disclosed herein provides lift and descent assist throughout the entire range of the spring. When installed in a table system, as shown in FIG. 2, it can improve the reliability and performance of the table and the related motion control device. The tandem spring may allow for higher elevation speed, which can lead to safer and faster patient workflow. The table system may have improved up-time due to the improved reliability. Further, by adding a tandem spring, it may save cost on the motion control device, as the motion control device may experience less stress. In addition, the damper assembly provides the potential for smooth performance at the transition between higher and lower force gas springs, even with large differences in spring rates on the gas springs.

Figure 9:
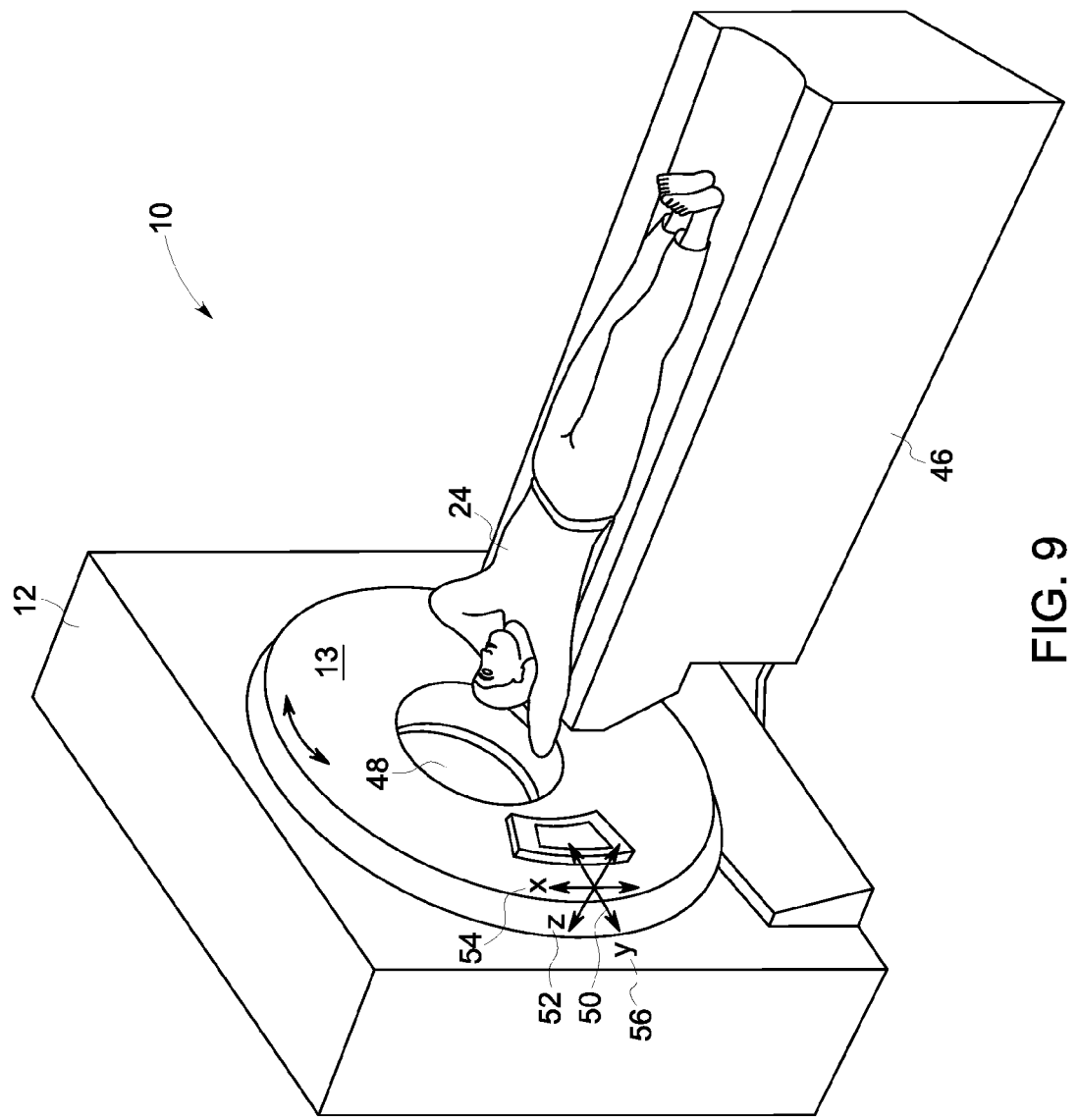
FIG. 9 is an angled view of a medical imaging system in accordance with an embodiment.
Figure 10:
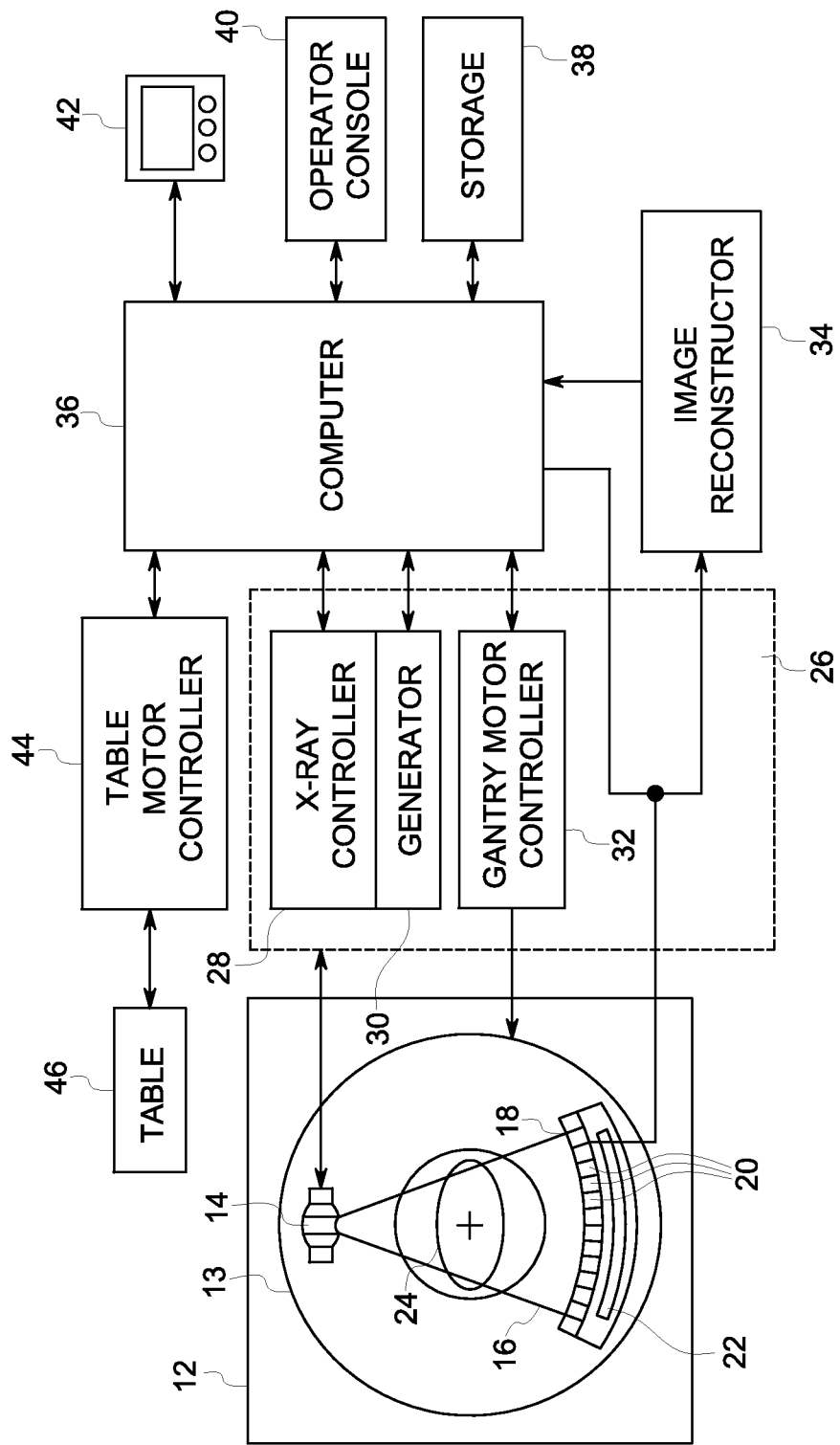
FIG. 10 is a block schematic diagram of a medical imaging system in accordance with an embodiment.

The table systems of FIG. 2 and FIG. 3 can be implemented in medical imaging systems. FIG. 9 is an angled view of a medical imaging system in accordance with an embodiment. FIG. 10 is a block schematic diagram of a medical imaging system in accordance with an embodiment.

FIGS. 9 and 10 show a computed tomography (CT) imaging system 10 including a gantry 12. Gantry 12 has a rotary member 13 an x-ray source 14 that projects a beam of x-rays 16 toward a detector assembly 18 on the opposite side of the rotary member 13. A main bearing may be utilized to attach the rotary member 13 to the stationary structure of the gantry 12. X-ray source 14 includes either a stationary target or a rotating target. Detector assembly 18 is formed by a plurality of detectors 20 and data acquisition systems (DAS) 22, and can include a collimator. The plurality of detectors 20 sense the projected x-rays that pass through a subject 24, and DAS 22 converts the data to digital signals for subsequent processing. Each detector 20 produces an analog or digital electrical signal that represents the intensity of an impinging x-ray beam and hence the attenuated beam as it passes through subject 24. During a scan to acquire x-ray projection data, rotary member 13 and the components mounted thereon can rotate about a center of rotation.

Rotation of rotary member 13 and the operation of x-ray source 14 are governed by a control mechanism 26 of CT system 10. Control mechanism 26 can include an x-ray controller 28 and generator 30 that provides power and timing signals to x-ray source 14 and a gantry motor controller 32 that controls the rotational speed and position of rotary member 13. An image reconstructor 34 receives sampled and digitized x-ray data from DAS 22 and performs high speed image reconstruction. The reconstructed image is output to a computer 36 which stores the image in a computer storage device 38.

Computer 36 also receives commands and scanning parameters from an operator via operator console 40 that has some form of operator interface, such as a keyboard, mouse, touch sensitive controller, voice activated controller, or any other suitable input apparatus. Display 42 allows the operator to observe the reconstructed image and other data from computer 36. The operator supplied commands and parameters are used by computer 36 to provide control signals and information to DAS 22, x-ray controller 28, and gantry motor controller 32. In addition, computer 36 operates a table motor controller 44 which controls a motorized table 46 to position subject 24 and gantry 12. Particularly, table 46 moves a subject 24 through a gantry opening 48, or bore, in whole or in part. A coordinate system 50 defines a patient or Z-axis 52 along which subject 24 is moved in and out of opening 48, a gantry circumferential or X-axis 54 along which detector assembly 18 passes, and a Y-axis 56 that passes along a direction from a focal spot of x-ray tube 14 to detector assembly 18.

In addition the tandem spring could be applied to non-medical applications where vertical lift safety and an optimized elevation lift drive is needed. One such example would be an ergonomics lift station on an assembly line. Another such example is lifting assist of cover or lid assemblies. Another such example would be in automotive contexts raising hoods, doors, and other car parts.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the invention without departing from their scope. While the dimensions and types of materials described herein are intended to define the parameters of the various embodiments of the invention, the embodiments are by no means limiting and are exemplary embodiments. Many other embodiments will be apparent to those of skill in the art upon reviewing the above description. The scope of the various embodiments of the invention should, therefore, be determined with reference to the appended claims, along with the full scope of equivalents to which such claims are entitled.

In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments of the invention, including the best mode, and also to enable any person skilled in the art to practice the various embodiments of the invention, including making and using any devices or systems and performing any incorporated methods. The patentable scope of the various embodiments of the invention is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A spring system, comprising:
a higher force spring comprising a first spring body and a first rod extending from the first spring body;
a lower force spring comprising a second spring body and a second rod extending from the second spring body;
a damper assembly attached to the first rod or the second rod;
wherein the first spring body is positioned adjacent to the second spring body; and
wherein the higher force spring, the lower force spring, and the damper assembly provide force in the same direction.

2. The spring system of claim 1, wherein
the damper assembly comprises a damper spring, the damper spring having a force between the force of the lower force spring and the higher force spring to provide smoothing of the force transition between the lower force spring and higher force spring during compression or extension of the spring system.

3. The spring system of claim 1, wherein
the damper assembly is attached at the end of the second rod; and
the lower force spring is positioned between the damper and the higher force spring.

4. The spring system of claim 1, wherein
the higher force spring is a gas spring; and
the lower force spring is a gas spring.

5. The spring system of claim 1, wherein
the higher force spring and lower force spring are positioned back-to-back such that the first spring body is attached to the second spring body at the body end of each spring.

6. The spring system of claim 1, wherein
the higher force spring does not compress until the lower force spring and the damper assembly are substantially compressed.

7. The spring system of claim 1, wherein
the damper assembly comprises a damper spring; and
the damper spring compresses after the lower force spring has substantially compressed and before the higher force spring substantially compresses.

8. The spring system of claim 1, wherein
the damper assembly comprises a damper spring and a mechanical stop to prevent full compression of the damper spring.

9. The spring system of claim 1, wherein
the higher force spring and the lower force spring are substantially cylindrical.

10. A table system, comprising:
a base;
a table top;
at least one table leg;
a spring system comprising a higher force spring and a lower force spring, wherein the higher force spring and lower force spring are positioned back-to-back such that the first spring body is attached to the second spring body at the body end of each spring, wherein the spring system is movably attached to the base and one of the table top or a table leg;
a motion control device capable of moving the table top in relation to the base; and
wherein the spring system provides dual-rate assistance to the motion control device for a table movement operation.

11. The table system of claim 10, wherein
the table movement operation is a raising or lowering motion of the table top with respect to the base.

12. The table system of claim 10, wherein
the dual-rate assistance provides a lower lift force at higher elevations of the table top and a higher lift force at lower elevations of the table top.

13. The table system of claim 10, wherein
the spring system further comprises a damper assembly.

14. The table system of claim 13, wherein
the damper assembly comprises a damper spring with a force between the force of lower force spring and the force of the higher force spring.

15. The table system of claim 14, wherein
the damper spring is one of a mechanical spring, a coil spring, a rubber spring, spring washers, and a gas spring.

16. The table system of claim 13, wherein
the damper assembly comprises a damper spring and a mechanical stop to prevent full compression of the damper spring.

17. The table system of claim 10, wherein
the spring system further comprises a damper assembly including a damper spring with a force between the force of the lower force spring and the force of the higher force spring; and
the damper assembly is attached to the end of the second spring body.

18. The table system of claim 17, wherein
the higher force spring end of the spring system is attached to the base; and
the damper assembly end of the spring system is attached to the one of the table top or a table leg.

19. The table system of claim 10, wherein
the higher force spring is a gas spring; and
the lower force spring is a gas spring.

* * * * *